United States Patent [19]

Cozzini

[11] 4,263,497
[45] Apr. 21, 1981

[54] WELDING GUIDE

[76] Inventor: Artemio S. Cozzini, 3464 N. Dousman St., Milwaukee, Wis. 53212

[21] Appl. No.: 961,968

[22] Filed: Nov. 20, 1978

[51] Int. Cl.³ .................. B23K 9/28; B23K 37/02; H05B 7/10
[52] U.S. Cl. .................. 219/138; 219/124.31; 219/125.1; 228/45
[58] Field of Search ............... 219/124.31, 125.1, 126, 219/138; 228/25, 45; 401/193; 266/56, 66

[56] References Cited

U.S. PATENT DOCUMENTS

| | | | |
|---|---|---|---|
| 2,040,062 | 5/1936 | Ost et al. | 266/66 X |
| 2,125,916 | 8/1938 | Halbing | 228/25 |
| 2,125,923 | 8/1938 | Hutchison et al. | 228/25 |
| 2,181,974 | 12/1939 | Kehl | 228/25 X |
| 2,402,310 | 6/1946 | Beaumier | 401/193 |
| 3,527,918 | 9/1970 | Fielder et al. | 219/124.31 |
| 3,670,139 | 6/1972 | Pandjiris et al. | 219/73.2 |

FOREIGN PATENT DOCUMENTS 81034  7/1934  Sweden ..................... 228/45

Primary Examiner—B. A. Reynolds
Assistant Examiner—Keith E. George
Attorney, Agent, or Firm—Andrus, Sceales, Starke & Sawall

[57] ABSTRACT

A welding guide to be attached to a welding head to aid in welding a joint at an outside corner or edge. The guide includes a collar attached to the welding head and a pair of legs are connected to opposite sides of the collar and straddle the joint to be welded to center the welding head over the joint. Each leg includes an elongated section which rides on the workpiece at locations spaced from the joint and the forward ends of the legs are connected together by a curved tip.

2 Claims, 3 Drawing Figures

WELDING GUIDE

BACKGROUND OF THE INVENTION

When welding a joint along an outside corner or edge, as when fabricating a metal cabinet, it is difficult to properly maintain alignment of the welding head with the joint as the weld progresses. This results in an irregular weld bead and as the outside corner is generally exposed to view in the finished product, substantial grinding is required to smooth out the irregularities in the weld bead.

In the past, guides have been associated with welding heads to align the head with the joint to be welded. Generally, these guides have been used when welding inside corners. U.S. Pat. No. 3,670,139 discloses a mechanism for welding I-beams in which a pair of wheels are associated with the welding head and ride on the web and flange of the I-beam when welding the inside corner of the beam. However, there have been no commercially available guides for use in welding outside corners or edges.

SUMMARY OF THE INVENTION

The invention is directed to an inexpensive welding guide to be attached to a welding head to aid in welding a joint extending along an outside corner or edge. In accordance with the invention, the guide includes a collar which is attached to the welding head and a pair of legs extend downwardly from opposite sides of the collar and straddle the joint to be welded and center the welding head over the joint.

Each leg includes an elongated section which is adapted to ride on the workpiece on opposite sides of the joint and the forward ends of the legs are connected together by a curved tip.

The guide enables the welding head to be maintained in precise alignment with the outside corner or edge to be welded and thereby reduces irregularities in the weld bead and decreases the amount of grinding necessary to provide the finished product.

The guide is of inexpensive construction and can be readily attached to all common types of welding heads.

The guide is constructed so that it does not interfere with the welder's vision and similarly does not interfere with the depositing of the weld metal in the joint to be welded.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

Figure 1:
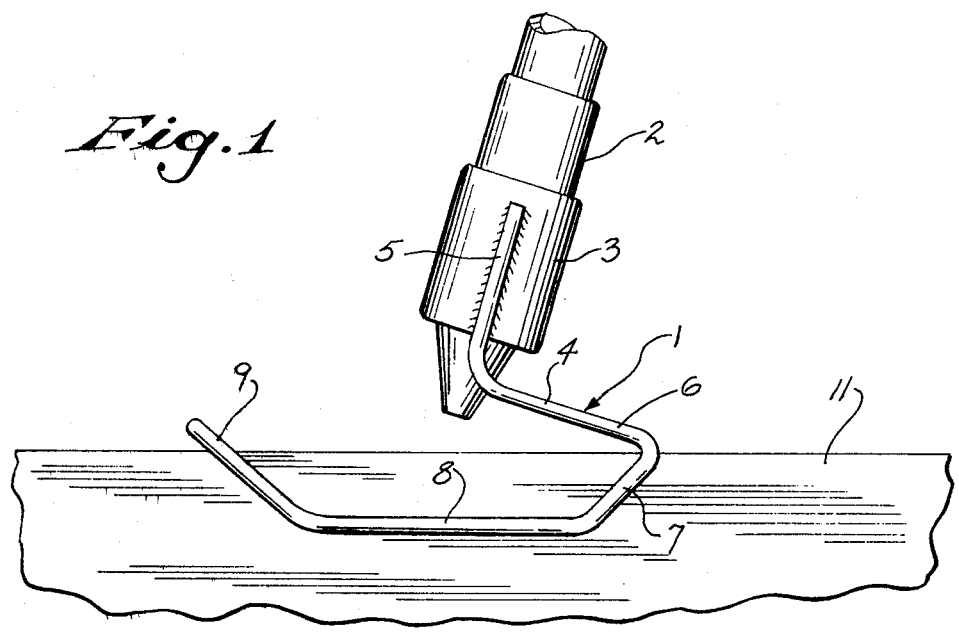
FIG. 1 is a side elevaton of the welding guide of the invention as attached to a welding head.

The drawings show an attachment 1 to be associated with a welding head 2 to aid in welding a joint at an outside corner or edge.

The attachment or guide 1 includes a collar 3 which is secured to the welding head 2 by a press fit or a suitable clamp, not shown. A pair of legs 4 extend downwardly from opposite sides of the collar and each leg includes a generally vertical section 5, a rearwardly extending section 6, a diagonal section 7, and an elongated, generally horizontal section 8. The forward ends of the elongated sections 8 are connected together by a curved tip 9.

Figure 2:
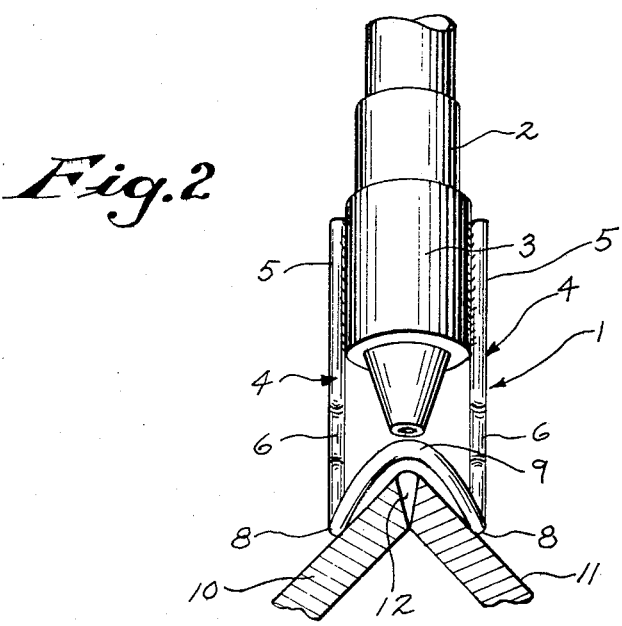
FIG. 2 is an end view of the welding guide shown in FIG.1.
Figure 3:
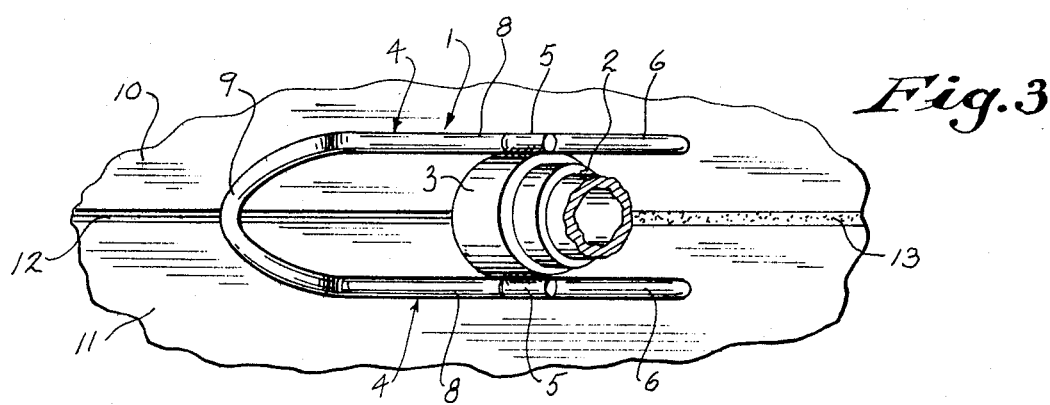
FIG. 3 is a top plan view of the structure shown in FIG. 1.

As illustrated in FIGS. 1 and 2, the elongated sections 8 are adapted to ride along the outer surfaces of the workpieces 10 and 11, which are located at an angle with respect to each other to provide a joint 12 to be welded. With the sections 8 in engagement with the respective workpieces 10 and 11, the welding head 2 will be centered over the joint 12 as shown in FIG. 2.

The rearward inclination of section 6 enables the elongated sections 8 to be centered with respect to the lower extremity of the welding head 2, as shown in FIG. 1, to provide fore-and-aft stability for the guide. The curved tip 9, which connects the sections 8 together, provides increased rigidity for the unit and is spaced upwardly from the joint 12 so that it will not catch on the workpieces as the guide and welding head are moved forwardly in making the weld.

By maintaining the sections 8 in contact with the workpieces 10 and 11, the welding head 2 is centered over the joint 12 to provide a more uniform weld bead 13, thereby reducing irregularities in the weld bead and decreasing the amount of grinding necessary to provide the finished bead.

The guide, except for the extremity of the tip 9, does not extend across the joint 12 to be welded so that the guide does not interfere with the welder's vision nor does it interfere with the depositing of the weld metal.

The guide is of inexpensive construction and can be readily attached to standard welding heads.

Various modes of carrying out the invention are contemplated as being within the scope of the following claims particularly pointing out and distinctly claiming the subject matter which is regarded as the invnetion.

I claim:

1. A welding apparatus for welding a joint extending along an outside corner of a workpiece, comprising, welding nozzle to feed a welding wire toward the workpiece, a collar to be attached around said nozzle, a pair of wire form legs extending downwardly from opposite sides of the collar, each leg including a rearwardly extending section and a elongated generally straight guide section connected to the rearwardly extending section and extending forwardly therefrom, and an upwardly inclined laterally extending tip section connecting the forward ends of th elongated guide sections, said guide sections extending both forwardly and rearwardly with respect to said collar, said guide sections being generally parallel to each other and disposed to ride on the workpiece on opposite sides of said joint to thereby maintain the welding apparatus in alignment with said joint and to obtain a more uniform weld.

2. The guide of claim 1, wherein the longitudinal midpoints of said elongated guide sections are disposed in a vertical plane extending through the collar.

* * * * *